United States Patent [19]

Mueller et al.

[11] Patent Number: 5,869,434
[45] Date of Patent: Feb. 9, 1999

[54] FREE-FLOWING BOREHOLE SERVICING PREPARATIONS CONTAINING LINEAR α-OLEFINS, MORE PATRICULARLY CORRESPONDING DRILLING FLUIDS

[75] Inventors: Heinz Mueller, Monheim; Claus-Peter Herold, Mettmann; Matthias Fies, Krefeld; Stephan Von Tapavicza, Erbrath, all of Germany

[73] Assignee: Henkel Kommanditgesellschaft auf Aktien, Duesseldorf, Germany

[21] Appl. No.: 750,829

[22] PCT Filed: Jun. 6, 1995

[86] PCT No.: PCT/EP95/02143

§ 371 Date: Dec. 13, 1996

§ 102(e) Date: Dec. 13, 1996

[87] PCT Pub. No.: WO95/34610

PCT Pub. Date: Dec. 21, 1995

[30] Foreign Application Priority Data

Jun. 13, 1994 [DE] Germany ............... 44 20 455.8

[51] Int. Cl.$^6$ ................. C09K 7/00; C09K 7/02
[52] U.S. Cl. ............ 507/110; 507/103; 507/116; 507/138; 507/139; 507/905
[58] Field of Search ................ 507/103, 905, 507/110, 116, 138, 139

[56] References Cited

U.S. PATENT DOCUMENTS

| | | | |
|---|---|---|---|
| 4,374,737 | 2/1983 | Larson et al. | 252/8.5 |
| 4,481,121 | 11/1984 | Barthel | 252/8.5 |
| 5,106,516 | 4/1992 | Mueller et al. | 507/138 |
| 5,189,012 | 2/1993 | Patel et al. | 507/103 |
| 5,194,422 | 3/1993 | Mueller et al. | 507/136 |
| 5,232,910 | 8/1993 | Mueller et al. | 507/138 |
| 5,252,554 | 10/1993 | Mueller et al. | 507/138 |
| 5,254,531 | 10/1993 | Mueller et al. | 507/131 |
| 5,432,152 | 7/1995 | Dawson et al. | 507/103 |
| 5,461,028 | 10/1995 | Mueller et al. | 507/138 |
| 5,663,122 | 9/1997 | Mueller et al. | 507/110 |
| 5,755,892 | 5/1998 | Herold et al. | 134/2 |

FOREIGN PATENT DOCUMENTS

| | | |
|---|---|---|
| 386 636 | 9/1990 | European Pat. Off. . |
| 386 638 | 9/1990 | European Pat. Off. . |
| 391 251 | 10/1990 | European Pat. Off. . |
| 391 252 | 10/1990 | European Pat. Off. . |
| 624 481 | 12/1994 | European Pat. Off. . |
| 38 42 659 | 6/1990 | Germany . |
| 38 42 703 | 6/1990 | Germany . |
| 39 03 784 | 8/1990 | Germany . |
| 39 03 785 | 8/1990 | Germany . |
| 39 07 391 | 9/1990 | Germany . |
| 39 07 392 | 9/1990 | Germany . |
| 39 11 238 | 10/1990 | Germany . |
| 39 11 299 | 10/1990 | Germany . |
| 39 15 875 | 11/1990 | Germany . |
| 39 15 876 | 11/1990 | Germany . |
| 40 18 228 | 12/1991 | Germany . |
| 40 19 266 | 1/1992 | Germany . |
| WO 95/06695 | 3/1995 | WIPO . |
| WO 95/21226 | 8/1995 | WIPO . |

OTHER PUBLICATIONS

New Base Oil Used in Low–Toxicity Oil Muds, Journal of Petroleum Technology, 1985, pp. 137 to 142.
New Drilling Fluid Technology—Mineral Oil Mud, Journal of Petroleum Tech, 1984, pp. 975–981.
Composition and Properties of Oil Well Drilling Fluids, 4th Ed., 1980/81, Gulf Publishing Co., Houston.
Applied Drilling Engineering, First Printing, Soc. of Petroleum Engineers, Richardson, pp. 76–81, 1986.
Degradation of Unsaturated Hydrocarbons by Methanogenic Enrichment Cultures in FEMS Microbiology Ecology 31 (1985), 69–77, published by Elsevier.
Linear Alpha Olefins of Chemical Economics Handbook—SRI International (1993).
Manual of Drilling Fluids Technology, NL–Baroid, London, GB, 1979.
Drilling Fluid Components, Chapter 11 of Composition and Properties of Oil Well Drilling Fluids.
Petroleum Engineer International, Sep. 1987, 32–40.

*Primary Examiner*—Shean C. Wu
*Attorney, Agent, or Firm*—Ernest G. Szoke; Wayne C. Jaeschke; Real J. Grandmaison

[57] ABSTRACT

The invention relates to the use of at least predominantly linear hydrocarbon compounds olefinically unsaturated in the alpha-position with flashpoints of at least about 80° as the oil phase or as part of the oil phase of oil- or water-based free-flowing borehole servicing preparations. Particular significance is attributed to corresponding drilling fluids which, together with the alpha-olefins, contain other oil phases from the field of borehole servicing preparations and are distinguished by ecological compatibility, being degradable under both aerobic and anaerobic conditions. Suitable mixture components for the oil phase are, in particular, oleophilic alcohols, ethers and corresponding esters selected from carboxylic acid esters and/or carbonic acid esters.

22 Claims, No Drawings

FREE-FLOWING BOREHOLE SERVICING PREPARATIONS CONTAINING LINEAR α-OLEFINS, MORE PATRICULARLY CORRESPONDING DRILLING FLUIDS

BACKGROUND OF THE INVENTION

1. Field of the Invention

This invention relates to new borehole servicing preparations which flow freely under normal conditions and which are made up using an oil phase. As a characteristic example of servicing preparations of the type in question, the invention is described hereinafter with reference to drilling fluids and drilling muds based thereon which may be used both in land-supported drilling and in offshore drilling. However, the modification according to the invention of auxiliary fluids of the type in question is by no means limited to this particular application. The many other auxiliary fluids used in the specialist field in question, for example spotting fluids, spacers, packer fluids, auxiliary workover, stimulation and fracturing fluids, may also be correspondingly modified.

The invention is concerned both with auxiliary fluids of the type mentioned which are based on oils, i.e. which work with a continuous oil phase, and with auxiliaries in which the oil phase is emulsified in a continuous phase, more particularly an aqueous continuous phase. Drilling fluids and drilling muds based thereon are characteristic examples of the various corresponding possibilities.

On the one hand, water-based drilling fluids containing around 1 to 50% of emulsified oil phase in addition to other typical auxiliaries encountered in drilling fluids are known and are also referred to as o/w emulsion fluids. On the other hand, oil-based drilling fluids in which the oil forms the fluid phase or at least a substantial part of the fluid phase as a continuous oil phase are widely used in practice. Particular significance is attributed in this regard to so-called invert drilling muds which—on the basis of w/o emulsions—contain a disperse aqueous phase in the continuous oil phase. The content of disperse aqueous phase is typically in the range from about 5–10% by weight to about 50–60% by weight. In addition to these w/o invert drilling muds, however, there are also the so-called true oil muds of which the liquid phase consists almost entirely of a continuous oil phase and which contain at most small quantities—normally not more than 5 to 10% by weight—of dispersed aqueous phase.

The invention relates equally to the two fields in question, namely oil-based drilling fluids and water-based drilling emulsions.

The use of the new borehole servicing fluids is of particular significance for the development of oil and gas occurrences, particularly in the marine sector, but is by no means limited to this particular field of application. The new systems may also be generally used in land-supported drilling operations, for example in geothermal drilling, water drilling, geoscientific drilling, so-called river-crossing drilling and mine drilling. Irrespective of this broad range of applications of the principles according to the invention, the technical teaching is described hereinafter with reference to drilling muds.

2. Discussion of Related Art

It is known that drilling fluids for sinking bores in rock and bringing up the rock cuttings are slightly thickened, fluid systems which may be assigned to one of the following three classes:

water-based drilling fluids, oil-based drilling fluids (true oil muds and so-called w/o invert emulsion muds) and water-based o/w emulsions which contain a heterogeneous finely dispersed oil phase in a continuous aqueous phase.

Drilling fluids on a continuous oil basis, more particularly w/o invert emulsions, are generally made up of a three-phase system, namely: oil, water and fine-particle solids. The aqueous phase is present in the continuous oil phase in, heterogeneous fine dispersion. There are a whole range of additives, including in particular emulsifiers, weighting agents, fluid loss additives, alkali reserves, viscosity regulators and the like. Full particulars can be found, for example, in the Article by P. A. Boyd et al. entitled "New Base Oil Used in Low-Toxicity Oil Muds" in Journal of Petroleum Technology, 1985, 137 to 142 and in the Article by R. B. Bennet entitled "New Drilling Fluid Technology -Mineral Oil Mud" in Journal of Petroleum Technology, 1984, 975 to 981 and the literature cited therein.

Drilling fluids based on aqueous o/w emulsion systems occupy an intermediate position between water-based systems and oil-based invert muds in terms of their performance properties. Detailed information can be found in the relevant specialist literature, cf. for example the book by George R. Gray and H. C. H. Darley entitled "Composition and Properties of Oil Well Drilling Fluids", 4th Edition, 1980/81, Gulf Publishing Company, Houston, and the extensive specialist and patent literature cited therein and the manual entitled "Applied Drilling Engineering" by Adam T. Borgoyne, Jr. et al., First Printing, Society of Petroleum Engineers, Richardson, Tex. (USA).

In practice, the oil phases of drilling fluids of the type described in these references and other borehole servicing preparations of comparable composition have until very recently been formed almost exclusively by selected mineral oil fractions. Accordingly, considerable environmental pollution occurs when, for example, the drilling muds enter the environment either directly or via the drilled rock. Although mineral oils are aerobically degradable in the presence of suitable bacterial strains, the degradation process is relatively slow. Anaerobically, mineral oils are virtually non-degradable and, accordingly, may be regarded as causing long-term pollution.

These problems have been known to experts for years. Thus, U.S. Pat. Nos. 4,374,737 and 4,481,121 describe oil-based invert drilling fluids in which so-called non-polluting oils are said to be used. De-aromaticized mineral oil fractions and ester oils of vegetable and animal origin are named alongside one another as non-polluting oils of equal rank. The ester oils are triglycerides of natural fatty acids which, ecologically, are known to be safe and distinctly superior in this respect to hydrocarbon fractions. These proposals cannot be put into practice for the particularly important field of oil-based w/o invert emulsion drilling fluids. The primary and secondary hydrolysis products of these triglyceride esters, which are formed in use, lead to uncontrollable changes in the fluidity of the w/o emulsions. More particularly, complete thickening occurs in a very short time.

In a relatively large number of earlier patent applications, applicants describe proposals for replacing the mineral oil fractions by ecologically safe, comparatively readily degradable oil phases. Four different types of replacement oils are disclosed and may even be used in admixture with one another. The substitutes in question are selected oleophilic carboxylic acid esters, at least substantially water-insoluble alcohols which flow freely under working conditions, corresponding ethers and selected carbonic acid esters, cf. the following German patent applications which have become part of the prior art literature in the form of the DE-A1 specifications: 38 42 659, 38 42 703, 39 07 391, 39 07 392, 39 03 785, 39 03 784, 39 11 238, 39 11 299, 40 18 228 and 40 19 266. All these documents are concerned with oil-based drilling fluids, more particularly of the w/o invert type. Water-based emulsion drilling fluids using oil phases of increased degradability are described in the following German patent applications identified by the publication numbers of the DE-A1 specifications: 39 15 876, 39 15 875, 39 16 550 and the already cited 40 18 228 and 40 19 266.

Other proposals have also been put forward with a view to replacing mineral oils in borehole servicing preparations of the type described herein by other oil phases, cf. U.S. Pat. No. 5,189,012. This document proposes the use of synthetic hydrocarbon compounds from the group of branched-chain oligomers which have been produced by oligomerization of $C_{2-14}$ olefins to average molecular weights of the oligomer in the range from 120 to 1,000. The Examples of this document describe tests to determine the toxicity of these branched hydrocarbon oligomers towards selected test organisms (Mysidopsis Bahia). There is no reference to tests for determining the degradability and, in particular, the anaerobic degradability of these branched hydrocarbon compounds which are also known among experts as "poly-alpha-olefins". Applicants' investigations of these problems have indicated that poly-alpha-olefins show little or no anaerobic degradability.

By contrast, oil phases based on the ester oils described in the documents cited above and corresponding oleophilic alcohols are distinguished by surprisingly good degradability both under aerobic conditions and in particular under anaerobic conditions. Starting out from this fact, selected monocarboxylic acid esters are now used worldwide as replacement oils, more particularly for drilling muds, in the field of offshore drilling. At the present time, particular significance is attributed in this regard to the esters of saturated monocarboxylic acids containing 12 to 16 carbon atoms and monohydric alcohols which are described in DE-A1 38 41 703.

The problem addressed by the invention and its technical solution

The invention sought to broaden the range of technical possibilities presently available for alternative oil phases in the field of application in question. More particularly, the problem addressed by the present invention was to increase the ability of liquid and, in particular, water-containing borehole servicing preparations to withstand high temperatures without at the same time compromising their degradability both under aerobic conditions and under anaerobic conditions. The following basic observations are relevant in this regard:

The alternative oil phases based on carboxylic acid esters widely used today combine optimal results under typical in-use conditions both from the point of view of operational efficiency and from the point of view of ecological compatibility as reflected in their anaerobic degradability. Despite the basic susceptibility to hydrolysis, even water-containing systems of this type, more particularly the w/o invert systems, are astonishingly stable up to relatively high temperatures at the bottom of the borehole. However, if extreme temperatures, for example of the order of 200° C. or higher, are reached, inreasing ester hydrolysis can occur to the detriment of the process.

Oleophilic alcohols are not susceptible to hydrolysis and combine this advantage with ready aerobic and anaerobic degradability. However, alcohol-based w/o muds show flow properties which may call for particular attentiveness in operation, presumably on account of their tendency to form hydrogen bridges, so that hitherto hydrolysis-resistant oil phases based on oleophilic alcohols have not been successfully used in practice.

The problem addressed by the teaching according to the invention was to enable selected hydrocarbon compounds to be used as the oil phase or, more particularly, as a mixture component of the oil phase in the field in question. By virtue of their structure, the selected hydrocarbon compounds would largely achieve the required combination of good performance properties and ecological compatibility, particularly in the form of anaerobic degradability. The teaching according to the invention is based on the additional concept that certain deficiencies in the technical performance properties are acceptable. By mixing the pure hydrocarbon compounds with alternative oil phases of the type mentioned above and, more particularly, with oils based on esters and/or on oleophilic alcohols, certain weaknesses can be intercepted and corrected. The teaching according to the invention is based in particular on the observation that corresponding mixtures are capable of combining optimal technical performance properties without in any way comprising the advantage of ecological compatibility as reflected in aerobic and/or anaerobic degradability.

The teaching of the invention described hereinafter is based on the fact that at least substantially linear hydrocarbon compounds olefinically unsaturated in the alpha position—hereinafter also referred to as "linear alpha-olefins (LAOS)"—can also be anaerobically degraded using microorganism strains occurring in practice on the seabed. Reference is made in this connection to the article by B. Schink entitled "Degradation of Unsaturated Hydrocarbons by Methanogenic Enrichment Cultures" in FEMS Microbiology Ecology 31 (1985), 69–77, published by Elsevier. It can be seen from this publication that alpha-olefins with a chain length of interest to the application according to the invention, for example alpha-hexadecene, can even be degraded under anaerobic conditions using anoxic marine sediments as inoculation medium.

DESCRIPTION OF THE INVENTION

In a first embodiment, therefore, the present invention relates to the use of at least substantially linear hydrocarbon compounds olefinically unsaturated in the alpha-position (linear alpha-olefins LAOS) with flashpoints of at least 80° C. as a constituent of oil- or water-based free-flowing borehole servicing preparations.

In one important embodiment, a) LAOS flowable and pumpable at temperatures of 0° to 20° C. and more particularly at temperatures of 0° to 10° C. or b) solutions or mixtures of LAOS in ecologically safe water-insoluble oils which are flowable and pumpable at temperatures in the ranges mentioned above are used as the continuous or disperse oil phase of oil- or water-based drilling fluids or other free-flowing borehole servicing preparations. In the case of oil-based servicing preparations, particular practical significance is attributed to the above-described w/o invert emulsions which contain a disperse aqueous phase in the continuous oil phase as defined in accordance with the invention.

In one particularly important embodiment, the invention relates to borehole servicing preparations, more particularly drilling fluids, flowable and pumpable at temperatures of 5° to 20° C. based either on a continuous oil phase, optionally in admixture with a limited quantity of a disperse aqueous phase (w/o invert type), or on an o/w emulsion with a disperse oil phase in the continuous aqueous phase, these preparations optionally containing typical dissolved and/or dispersed auxiliaries, such as viscosifiers, emulsifiers, fluid loss additives, wetting agents, fine-particle weighting agents, salts, alkali reserves and/or biocides. This embodiment of the borehole servicing preparations according to the invention is characterized in that the preparations contain at least predominantly linear hydrocarbon compounds olefinically unsaturated in the alpha position (LAOS) with flashpoints of at least 80° C. and preferably of at least 90° C. in their oil phase. Particularly important embodiments of the invention are characterized by the presence of oil-based servicing preparations of the type mentioned which, in their continuous oil phase, contain the LAOS homogeneously mixed with other oil phases from the field of borehole servicing preparations which, in particular, are ecologically safe, i.e. are preferably degradable both under aerobic and under anaerobic conditions.

Particulars and preferred embodiments of the invention

At least predominantly linear alpha-olefins are known commercial products for various applications, cf. for example the chapter entitled "LINEAR ALPHA-OLEFINS" of Chemical Economics Handbook-SRI International (1993). They may be based on natural substances. More particularly, however, they are also synthetically produced on a large scale. LAOS based on natural substances are obtained by dehydration of native fatty alcohols as linear products with an even number of carbon atoms. Synthetically obtained LAOS—produced by oligomerization of ethylene—also frequently contain even numbers of carbon atoms in the chain, although there are also known processes for the production of odd-numbered alpha-olefins, cf. the cited article in Chemical Economics Handbook.

Even-numbered LAOS may used with advantage for the application according to the invention although the teaching according to the invention is not limited to even-numbered LAOS. By virtue of their volatility, LAOS as defined in accordance with the invention generally contain at least 10 and preferably at least 12 to 14 carbon atoms in the molecule. The upper limit for LAOS flowable at room temperature is $C_{18-20}$. However, this upper limit is not restrictive so far as the suitability of this class of compounds for use in accordance with is concerned. This is clear from the preferred variant of the invention where the LAOS are used in admixture with other, more particularly ecologically safe, oil phases. In mixtures such as these, comparatively small quantities of LAOS can have important effects so far as the properties of the mixed oil phase are concerned. Accordingly, the upper limit of suitable LAO compounds for the application with which the teaching according to the invention is concerned is distinctly above the $C_{18-20}$ limit mentioned above and, for example, may reach $C_{30}$. However, for oil-based borehole servicing preparations and, in particular, for w/o invert drilling muds, a chain length range of about 12 to 24 and, more particularly, 14 to 20 carbon atoms will generally be of particular significance.

As already mentioned, the rheological properties of the LAOS move into the background when mixtures of these components with other oil phases from the field of borehole servicing preparations are used. In this case, comparatively small or at least minor quantities of LAOS may be used in admixture with one or more other oil components. However, it can also be useful—depending on the particular requirements of the borehole in question—to form at least the predominant part of the free-flowing oil phase by the LAO component(s). Basically, the LAO content of the oil phase may be at least 2–5% by weight to 95–98% by weight. In preferred embodiments, the LAO content is at least 20% by weight to less than 50% by weight and, more particularly, at least about 50% by weight. Preferred upper limits to the LAO content of the oil phase are 90 to 95% by weight and, more particularly, 70 to 75% by weight. All these figures apply to the described embodiment in which the LAOS are used in admixture with other oil phases. So far as their identification is concerned, reference is made to applicants' above-cited specifications on the use of esters, ethers and alcohols and oil phases in borehole servicing preparations. The disclosures of these specifications are hereby specifically included as part of the disclosure of the present invention.

LAO-containing oil phases of which the rheological properties are tailored to the particular application are preferably used in accordance with the invention. Thus, where the oil phases are used as a continuous oil phase, it is possible to use corresponding oils or oil mixtures of which the solidification values (flow and pour point) are preferably below 0° C. and more preferably below −5° C. and which, in addition, preferably have a Brookfield (RVT) viscosity at 0° to 5° C. of not more than 55 mPas and preferably not more than 45 mPas. In the case of o/w emulsion muds or servicing preparations, the oil phase—which of course is now present as a disperse phase—may be defined far more broadly in its rheological properties. Oils with a Brookfield (RVT) viscosity of up to about 3 million mPas and preferably up to about 1 million mPas are suitable in their case.

Where mixtures of the LAOS with other soluble oil phases are used, the other soluble oil phases are preferably selected so that the mixed oil phases also have flashpoints of at least 80° C., preferably at least about 90° C. and, more particularly, above 100° C. Higher flashpoints of the mixed oil phases are preferred for safety reasons. Thus, flashpoints above 135° C. may generally be established.

The chemical nature and preferred selection criteria of the other selected oil phases to be used together with the LAOS are discussed in applicants' above-cited specifications on the particular type of oil. As mentioned above, the classes of monocarboxylic acid esters, polycarboxylic acid esters, carbonic acid esters, oleophilic alcohols and corresponding ethers are particularly suitable in this regard. The classes of ester compounds first listed can be formed in practice by partial hydrolysis of, in particular, volatile alcohol components. Accordingly, it is preferred to use mixture components which do not involve any toxicological risks, more particularly inhalation-toxicological risks, even in the event of partial saponification under in-use conditions. So far as the discussed classes of ester compounds are concerned, this means in particular that monohydric alcohols of these esters of natural and/or synthetic origin should preferably contain at least 6 carbon atoms, and, more preferably, at least 8 carbon atoms.

Carboxylic acid esters of polyhydric alcohols are known to be safe from the point of view of inhalation-toxicological risks. This applies in particular to corresponding esters of natural origin which are available in numerous forms as fats and/or oils of vegetable and/or animal origin and which—taking into account the further parameters defined in connection with the disclosure of the invention—are also suitable for the purposes of the invention.

To complete the disclosure of the invention, suitable mixture components are briefly summarized once more in the following.

Preferred ester oils of monocarboxylic acids belong to at least one of the following subclasses:

a) esters of $C_{1-5}$ monocarboxylic acids and monohydric and/or polyhydric alcohols, residues of monohydric alcohols containing at least 6 and preferably at least 8 carbon atoms and the polyhydric alcohols preferably containing 2 to 6 carbon atoms in the molecule, b) esters of monocarboxylic acids of synthetic and/or natural origin containing 6 to 16 carbon atoms, more particularly esters of corresponding aliphatically saturated monocarboxylic acids, and monohydric and/or polyhydric alcohols of the type mentioned under a); corresponding esters of $C_{12-16}$ monocarboxylic acids may also be free from residues of polyhydric alcohols, c) esters of mono- and/or poly-olefinically unsaturated monocarboxylic acids containing at least 16 carbon atoms and, more particularly, 16 to 24 carbon atoms and, in particular, monohydric linear and/or branched alcohols. However, corresponding esters of polyhydric alcohols of the type mentioned under a) are also particularly suitable; corresponding esters of glycerol can be of particular significance. Characteristic examples of such esters are glyceride oils of vegetable and/or animal origin which may be employed in technologically useful form in admixture with the LAO component, even in the embodiment of the w/o invert drilling fluids containing a dispersed aqueous phase. However, it is known that natural substances of the type in question are not confined to glycerol as the ester-forming alcohol component, particularly in the field of animal oils. Correspondingly, the teaching according to the invention is also not limited in this regard.

A definition of suitable polycarboxylic acid esters can be found in the above-cited DE-A1 40 19 266. Particularly important mixture components for mixing with the LAOS in accordance with the teaching of the invention can be carbonic acid diesters of the type described in DE-A1 40 18 228. Esters of carbonic acid are distinguished from the outset by increased resistance to hydrolysis under working conditions. By mixing with LAOS, it is even possible to obtain high-temperature-stable borehole servicing preparations which can be used at temperatures of up to 300° C. or even higher, but which nevertheless have the required ecological compatibility.

As already mentioned on more than one occasion, the oleophilic alcohols described in DE-A1 38 11 238 (=EP-A1 0 391 252) can be of particular importance as mixture components. At least substantially water-insoluble monohydric and/or polyhydric alcohols of natural and/or synthetic origin, which are flowable and pumpable at temperatures of 0° to 5° C., and mixtures thereof in ecologically safe water-insoluble oils are particularly suitable mixture components.

In the above-described embodiment where polycarboxylic acid esters are used, the following modification can be particularly important. Highly viscous complex esters with a pronounced lubricant character based on polybasic carboxylic acids and polyhydric alcohols and optionally co-condensed monohydric alcohols and/or monocarboxylic acids may be used to obtain substantial improvements in the lubricity of the oil phase, even in comparatively small quantities of, for example, 2 to 15% by weight, based on the oil phase as a whole. More particularly, the pure hydrocarbon oils in the form of the LAO compounds do of course generally show unsatisfactory lubricity and are clearly surpassed in this regard by ester oils. In addition, however, it is clear from the example described here that the use of multicomponent mixtures containing more than only two components as the oil phase—taking the general principles of the invention into account—can lead to important technical optimizations without compromising ecological compatibility as reflected in particular in aerobic and anaerobic degradation.

If the borehole servicing preparations according to the invention are formulated as invert drilling muds of the w/o type, preferred contents of their disperse aqueous phase are in the range from about 5 to 60% by weight and more preferably in the range from about 10 to 50% by weight, based on the free-flowing components. Around 10 to 45% by weight of disperse aqueous phase are values for oil-based w/o invert muds suitable for a broad range of applications.

In the case of the water-based o/w emulsion muds, the quantity of disperse oil phase is adapted to the particular technical requirements. In general, the oil content is in the range from about 1 to 50% by weight and preferably in the range from about 8 to 50% by weight, again based on the liquid component of the mud.

Additives in the oil-based or water-based drilling fluid

The general rules apply to the composition of the particular servicing fluids for which exemplary data are presented in the following with reference to corresponding drilling muds.

Invert drilling muds normally contain the finely dispersed aqueous phase in quantities of around 5 to 45% by weight and preferably in quantities of around 5 to 25% by weight together with the continuous oil phase.

The following rheological data apply to the rheology of preferred invert drilling muds according to the invention: plastic viscosity (PV) in the range from about 10 to 60 mPas and preferably in the range from about 15 to 40 mPas; yield point (YP) in the range from about 5 to 40 lb/100 ft$^2$ and preferably in the range from about 10 to 25 lb/100 ft$^2$—determined in either case at 50° C. The determination of these parameters, the methods used and the otherwise standard composition of the invert drilling muds described herein are covered in the prior art cited at the beginning and are described in detail, for example, in "Manual of Drilling Fluids Technology" published by NL-Baroid, London, GB, cf. in particular the chapter entitled "Mud Testing—Tools and Techniques" and also "Oil Mud Technology", which is freely available to those interested.

In emulsion drilling fluids, the dispersed oil phase is typically present in quantities of at least about 1 to 2% by weight, frequently in quantities of at least about 5% by weight and preferably in quantities of at least about 7 to 8% by weight in the case of an o/w emulsion. The percentage oil content should preferably be no more than about 50% by weight and, in particular, no more than about 40% by weight, based on the sum total of the unweighted liquid components oil/water.

In addition to water, it is possible to use any of the additives designed for comparable types of drilling fluids, of which the addition is normally intended to provide the fluid with a specific property spectrum. The additives may be water-soluble, oil-soluble and/or dispersible in water or oil.

Conventional additives include emulsifiers, fluid loss additives, soluble and/or insoluble substances which build up pseudoplasticity, alkali reserves, additives for inhibiting the unwanted exchange of water between drilled formations—for example water-swellable clays and/or salt layers—and the drilling fluid (for example based on water), wetting agents for improving the absorption of the emulsified oil phase by solid surfaces, for example for improving lubricity, and also for improving the oleophilic sealing of exposed rock formations or rock surfaces, biocides, for example for inhibiting the bacterial contamination of o/w emulsions and the like. Full particulars can be found in the relevant prior art as represented, for example, by the specialist literature cited at the beginning, cf. in particular Gray and Darley, loc. cit., chapter 11, "Drilling Fluid Components", of which the following are only a few examples:

Finely dispersed additives for increasing the density of the drilling fluid: barium sulfate (barite) is widely used, although calcium carbonate (calcite) or the mixed carbonate of calcium and magnesium (dolomite) are also used.

Agents for building up pseudoplasticity which also act as fluid loss additives: bentonite and hydrophobicized bentonite are mentioned in particular. For salt water muds, considerable significance is attributed in practice to other comparable clays, more particularly attapulgite and sepiolite.

Considerable significance can also be attributed in this regard to the co-use of organic polymer compounds of natural and/or synthetic origin, including in particular starch or chemically modified starches, cellulose derivatives, such as carboxymethyl cellulose, guar gum, xanthan gum, or even purely synthetic water-soluble and/or water-dispersible polymer compounds, more particularly of the high molecular weight polyacrylamide compound type with or without anionic or cationic modification. Polyalkyl methacrylates, for example the products marketed under the name of "VISCOPLEX" by Röhm GmbH, have also proved to be particularly suitable viscosity generators based on organic synthetic polymer compounds for LAO-based oil phases.

Diluents for controlling viscosity. The so-called diluents may be organic or inorganic. Examples of organic diluents are tannins and/or quebracho extract. Further examples are lignite and lignite derivatives, more particularly lignosulfonates. As mentioned above, however, one preferred embodiment of the invention dispenses with the use of toxic components in this very connection, the corresponding salts with toxic heavy metals, such as chromium and/or copper, being mentioned above all in this regard. One example of inorganic diluents are polyphosphate compounds.

Emulsifiers: the emulsifiers used are critically determined by the type of drilling fluid. Emulsifiers suitable for use in practice for forming w/o emulsions are, in particular, selected oleophilic fatty acid salts, for example those based on amidoamine compounds. Examples of such emulsifiers can be found in the above-cited U.S. Pat. No. 4,374,737 and in the literature cited therein.

Other emulsifiers are required for the formation of o/w emulsions, as known per se. However, it has been found that stable dispersion to form an o/w dispersion is very much easier than the corresponding dispersion of pure mineral oils of the type used in the prior art. This represents a first simplification. Another factor to be taken into consideration is that, where ester oils are used, effective o/w emulsifiers are subsequently formed by partial saponification under the effect of suitable alkali reserves where relatively long-chain carboxylic acid esters are used and, hence, contribute towards stabilizing the system.

Additives inhibiting the unwanted exchange of water, for example with clays: suitable additives of this type are the additives known from the prior art on oil- and water-based drilling fluids. The additives in question are in particular halides and/or carbonates of the alkali and/or alkaline earth metals, particular significance being attributed to corresponding potassium salts, optionally in conjunction with lime.

Further particulars can be found, for example, in the corresponding Articles in "Petroleum Engineer International", September 1987, 32–40 and "World Oil", November 1983, 93–97.

Alkali reserves: suitable alkali reserves are inorganic and/or organic bases adapted to the overall behavior of the drilling fluid, more particularly corresponding basic salts and hydroxides of alkali metals and/or alkaline earth metals and organic bases. The type and quantity of these basic components are selected and adapted to one another in known manner in such a way that the borehole servicing preparations are adjusted to a pH value in the neutral to moderately basic range, more particularly to a pH value in the range from about 7.5 to 11.

So far as organic bases are concerned, a distinction has understandably to be drawn between water-soluble organic bases, for example compounds of the diethanolamine type, and substantially water-insoluble bases of decidedly oleophilic character of the type described as additives in invert drilling muds based on ester oils in applicants above-cited published application DE-A1 39 03 785. The co-use of oil-soluble bases such as these also falls within the scope of the teaching according to the invention. However, oleophilic bases of this type, which are distinguished in particular by at least one relatively long hydrocarbon radical, for example containing 8 to 36 carbon atoms, are not dissolved in the aqueous phase, but rather in the oil phase. These basic components are important in several respects. On the one hand, they may act directly as an alkali reserve. On the other hand, they provide the dispersed oil droplet with a certain positive charge and hence lead to increased interaction with negative surface charges of the type encountered in particular in hydrophilic clays capable of ion exchange. According to the invention, it is possible in this way to influence hydrolytic cleavage and the oleophilic sealing of water-reactive rock layers.

Basically, the quantities in which the particular auxiliaries and additives are used are within the usual limits and, accordingly, may be taken from the relevant literature cited in the foregoing.

EXAMPLES

In Examples 1 to 4 below and the associated Comparison Example, corresponding mixtures are prepared in known manner on the basis of a comparatively water-rich standard formulation for oil-based drilling muds of the w/o type, the continuous oil phase in Examples 1 to 4 corresponding to the definition according to the invention. In the Comparison Example, the commercial product "PETROFREE®" is used as the continuous oil phase. This oil phase, which is widely used in practice, is known to be readily degradable both under aerobic and under anaerobic conditions and is largely based on saturated $C_{12-14}$ monocarboxylic acid esters.

The viscosity characteristics of the material are determined as follows before and after ageing: measurement of viscosity at 50° C. in a Fann-35 viscosimeter (SR12) of Baroid Drilling Fluids, Inc. The plastic viscosity (PV), yield point (YP) and gel strength (lb/100 ft$^2$) after 10 secs. and 10 mins. are determined in known manner.

The drilling fluids are aged by treatment for 16 h at 200° C. in a so-called roller oven.

In all the Examples, the drilling fluids tested are prepared in known manner on the basis of the following formulation:

193 ml continuous oil phase 8 g w/o emulsifier (EZ-Mul, a product of Baroid Drilling Fluids, Inc.)

3 g viscosifier (Rilanit Spezial a product of Henkel KGaA)

2 g lime (calcium hydroxide)
82 ml water
30 g CaCl$_2$.2H$_2$O
2 g organophilic bentonite (GELTONE, a product of Baroid Drilling Fluids, Inc.)
211 g barite (barium sulfate)

Examples 1 to 4

In Examples 1 to 4 according to the invention, the linear alpha-olefin (LAO) used is a corresponding C-18 LAO (Shop C-18, a product of Shell). The composition of the oil phases from Examples 1 to 4 and from the Comparison Example is set out in Table 1 below.

TABLE 1

| Example | | 1 | 2 | 3 | 4 | Comparison Example |
|---|---|---|---|---|---|---|
| C-18 LAO | ml | 193 | 145 | 96.5 | 96.5 | |
| Guerbet C16 alcohol | ml | | 48 | | | |
| Di-n-octyl ether | ml | | | 96.5 | | |
| PETROFREE | ml | | | | 96.5 | 193 |

Table 2 below shows the data of the drilling fluids (plastic viscosity (PV), yield point (YP) and gel strength after 10 secs. (10") and 10 mins. (10')) determined at 50° C. for Examples to 1 to 4 and for the Comparison Example.

TABLE 2

| Examples | 1 | 2 | 3 | 4 | Comparison Example |
|---|---|---|---|---|---|
| PV (mPas) | 28 | 62 | 29 | 44 | 47 |
| YP (lb/100 ft$^2$) | 26 | 139 | 28 | 47 | 91 |
| 10"/10' gel strength (lb/100 ft$^2$) | 11/13 | 73/74 | 14/17 | 20/25 | 39/41 |

Table 3 below shows the same data after ageing for 16 h at 200° C. in a roller oven.

TABLE 3

| Examples | 1 | 2 | 3 | 4 | Comparison Example |
|---|---|---|---|---|---|
| PV (mpas) | 21 | 38 | 18 | 59 | Cannot be determined |
| YP (lb/100 ft$^2$) | 1 | 23 | 6 | 55 | Cannot be determined |
| 10"/10' gel strength (lb/100 ft$^2$) | 6/7 | 3/9 | 4/6 | 22/25 | 57/75 |

Comparison of the figures set out in Tables 2 and 3 shows that mixtures of the C-18 LAO in particular with other ecologically safe oil phases lead to results of practical interest.

The invert drilling fluid based on the pure ester oil PETROFREE aged under high-temperature conditions is so seriously damaged by ester hydrolysis occurring in situ under the selected working conditions of the water-rich invert drilling fluid that neither the plastic viscosity nor the yield point can be determined (Comparison Example). Mixing of this ester oil phase with the C-18 olefin in a ratio of 1:1 leads to such a high degree of stabilization that, even after ageing for 16 hours at 200° C., acceptable rheological data can still be measured.

Although the incorporation of comparatively small quantities of the C-16 Guerbet alcohol in the C-18 LAO leads to considerable thickening of the w/o invert drilling fluid in the fresh state, the values can still be determined. However, ageing of the corresponding drilling fluid (Example 2) at high temperatures leads to very good rheological values which can have an advantageous effect in many respects in practice by comparison with the drilling fluid based on pure C-18 LAO.

Examples 5 to 8

Mixtures of linear alpha-olefins (LAO) containing 16 and 14 carbon atoms, i.e. C-16 LAO and C-14 LAO (products of Shell), with a $C_{12/18}$ fatty alcohol mixture and with technical oleyl alcohol (iodine value 80/85) were used as the continuous oil phase in the basic formulation described above. The composition of the oil phase is shown in Table 4.

TABLE 4

| Example | | 5 | 6 | 7 | 8 |
|---|---|---|---|---|---|
| C-16 LAO | ml | 128.7 | 96.5 | 128.7 | |
| C-14 LAO | ml | | | | 128.7 |
| $C_{12/18}$ Fatty alcohol | ml | 64.3 | 96.5 | | |
| Oleyl alcohol | ml | | | 64.3 | 64.3 |

Table 5 below shows the drilling fluid data for these Examples as determined at 50° C. after ageing in a roller oven for 16 h at 200° C.

TABLE 5

| Example | 5 | 6 | 7 | 8 |
|---|---|---|---|---|
| PV (mPas) | 22 | 43 | 25 | 20 |
| YP (lb/100 ft$^2$) | 43 | 73 | 41 | 34 |
| 10"/10' Gel strength (lb/100 ft$^2$) | 16/14 | 31/31 | 15/16 | 13/13 |

Examples 9 and 10

C-14 LAO (commercial product of Shell) is mixed with different quantities of refined rapeseed oil in these two Examples. In Example 9, the mixed oil phase contains the C-14 LAO in a quantity of 66.6% by weight; in Example 10, the quantity of C-14 LAO is 50% by weight—% by weight in both cases based on the mixture of the C-14 LAO and the added rapeseed oil.

Using these two oil phases, corresponding mixtures are prepared in accordance with the standard formuation for oil-based drilling fluids of the w/o type given at the beginning of the Examples. As in the preceding Examples, the plastic viscosity (PV) of the drilling fluids, their yield point (YP) and their gel strength after 10 secs. and 10 mins. are determined before and after ageing. In this case, too, the drilling fluids were aged by treatment in an autoclave for 16 hours at 200° C. as in the preceding Examples.

The data determined on the drilling fluids before and after ageing are set out in Tables 6 (freshly prepared drilling fluid) and 7 (aged drilling fluid).

TABLE 6

| | (before ageing) | |
|---|---|---|
| Examples | 9 | 10 |
| PV (mPas) | 54 | 93 |
| YP (lb/100 ft$^2$) | 125 | 98 |
| 10"/10' gel strength (lb/100 ft$^2$) | 73/73 | 81/59 |

TABLE 7

| | (after ageing for 16 h/200° C.) | |
|---|---|---|
| Examples | 9 | 10 |
| PV (mPas) | 40 | 49 |
| YP (lb/100 ft$^2$) | 28 | 30 |
| 10"/10' gel strength (lb/100 ft$^2$) | 4/4 | 3/4 |

We claim:

1. A drilling fluid composition comprising an auxiliary fluid, the auxiliary fluid consisting essentially of:
   (a) a water phase; and
   (b) an oil phase containing mixtures of linear alpha-olefins with an ecologically safe water-insoluble oil selected from the group consisting of esters of monocarboxylic acid containing from 1 to 24 carbon atoms and monohydric alcohols containing at least 6 carbon atoms, esters of monocarboxylic acid containing from 1 to 24 carbon atoms and polyhydric alcohols having from 2 to 6 carbon atoms, and mixtures thereof.

2. The composition of claim 1 wherein the linear alpha-olefins contain from 12 to 30 carbon atoms.

3. The composition of claim 2 wherein the linear alpha-olefins contain from 14 to 20 carbon atoms.

4. The composition of claim 1 wherein the linear alpha-olefins are present in the oil phase in an amount of from at least 5% by weight up to 90% by weight, based on the total weight of the oil phase.

5. The composition of claim 4 wherein the linear alpha-olefins are present in the oil phase in an amount of from 20% by weight to 50% by weight, based on the total weight of the oil phase.

6. The composition of claim 4 wherein the oil phase has a solidification value below 0° C., and a Brookfield viscosity at from 0° to 5° C. of up to 55 mPas.

7. The composition of claim 4 wherein the oil phase has a flash point of at least 80° C.

8. The composition of claim 7 wherein the oil phase has a flash point above about 135° C.

9. The composition of claim 1 wherein the water phase is present in the auxiliary fluid in an amount of from 5 to 60% by weight, based on the weight of the auxiliary fluid.

10. The composition of claim 1 wherein the oil phase is present in the auxiliary fluid in an amount of from 1 to 50% by weight, based on the weight of the auxiliary fluid.

11. The composition of claim 1 further comprising an additive selected from the group consisting of viscosifiers, emulsifiers, fluid loss additives, wetting agents, fine-particle weighing agents, salts, alkali reserves, biocides, and mixtures thereof.

12. A process for sinking a bore in rock comprising contacting the bore with a drilling fluid, during the drilling process, wherein the drilling fluid comprises an auxiliary fluid consisting essentially of:
   (a) a water phase; and
   (b) an oil phase containing oil components selected from the group consisting of linear alpha-olefins and mixtures of linear alpha-olefins with an ecologically safe water-insoluble oil selected from the group consisting of esters of monocarboxylic acid containing from 1 to 24 carbon atoms and monohydric alcohols containing at least 6 carbon atoms, esters of monocarboxylic acid containing from 1 to 24 carbon atoms and polyhydric alcohols having from 2 to 6 carbon atoms, and mixtures thereof.

13. The process of claim 12 wherein the linear alpha-olefins contain from 12 to 30 carbon atoms.

14. The process of claim 13 wherein the linear alpha-olefins contain from 14 to 20 carbon atoms.

15. The process of claim 12 wherein the oil phase of the auxiliary fluid is a mixture of from 5% by weight up to about 90% by weight, based on the total weight of the oil phase, of linear alpha-olefins with an ecologically safe water-insoluble oil.

16. The process of claim 15 wherein the linear alpha-olefins are present in the oil phase in an amount of from 20% by weight to 50% by weight, based on the total weight of the oil phase.

17. The process of claim 15 wherein the oil phase has a solidification value below 0° C., and a Brookfield viscosity at from 0° to 5° C. of up to 55 mPas.

18. The process of claim 15 wherein the oil phase has a flash point of at least 80° C.

19. The process of claim 15 wherein the oil phase has a flash point above about 135° C.

20. The process of claim 12 wherein the water phase is present in the auxiliary fluid in an amount of from 5 to 60% by weight, based on the weight of the auxiliary fluid.

21. The process of claim 12 wherein the oil phase is present in the auxiliary fluid in an amount of from 1 to 50% by weight, based on the weight of the auxiliary fluid.

22. The process of claim 12 wherein the drilling fluid further comprises an auxiliary component selected from the group consisting of viscosifiers, emulsifiers, fluid loss additives, wetting agents, fine-particle weighing agents, salts, alkali reserves, biocides, and mixtures thereof.

* * * * *